United States Patent [19]

Covell

[11] 4,214,687
[45] Jul. 29, 1980

[54] VEHICLE TOP SKI RACK

[76] Inventor: Calvin J. Covell, 1111 Corning St., #305, Los Angeles, Calif. 90035

[21] Appl. No.: 11,609

[22] Filed: Feb. 12, 1979

[51] Int. Cl.² ............................................. B60R 9/00
[52] U.S. Cl. ................................ 224/323; 211/60 SK
[58] Field of Search ...................... 224/45 S, 319, 321, 224/322, 323, 282, 329, 331; 211/60 SK; 280/11.37 K, 11.37 A; 248/499; 294/87.26, 87.24, 87 R, 115, 117, 118; 414/462, 465

[56] References Cited

U.S. PATENT DOCUMENTS

| 2,250,751 | 7/1941 | Cullen et al. | 294/117 |
| 2,788,929 | 4/1957 | Gallagher | 224/323 |
| 3,638,844 | 2/1972 | Bronson | 224/319 |
| 3,836,058 | 9/1974 | Penniman et al. | 224/323 |
| 3,888,398 | 6/1975 | Payne | 224/323 |
| 3,897,895 | 8/1975 | Read | 224/323 |

Primary Examiner—Robert J. Spar
Assistant Examiner—Kenneth Noland

[57] ABSTRACT

Apparatus comprising a car top ski rack of the type which is clamped to the rain gutters or edges of the vehicle roof by conventional metallic hooks and straps. A single unit is affixed to the vehicle roof and is provided with a plurality of sets of pivotal clamping arms with each set of clamping arms designed for securing a single pair of skis and poles. A single unit mounted transversely of the vehicle securely clamps skis and poles in place thus avoiding the necessity for a second unit spaced longitudinally of the vehicle from the first unit as in conventional ski racks.

11 Claims, 7 Drawing Figures

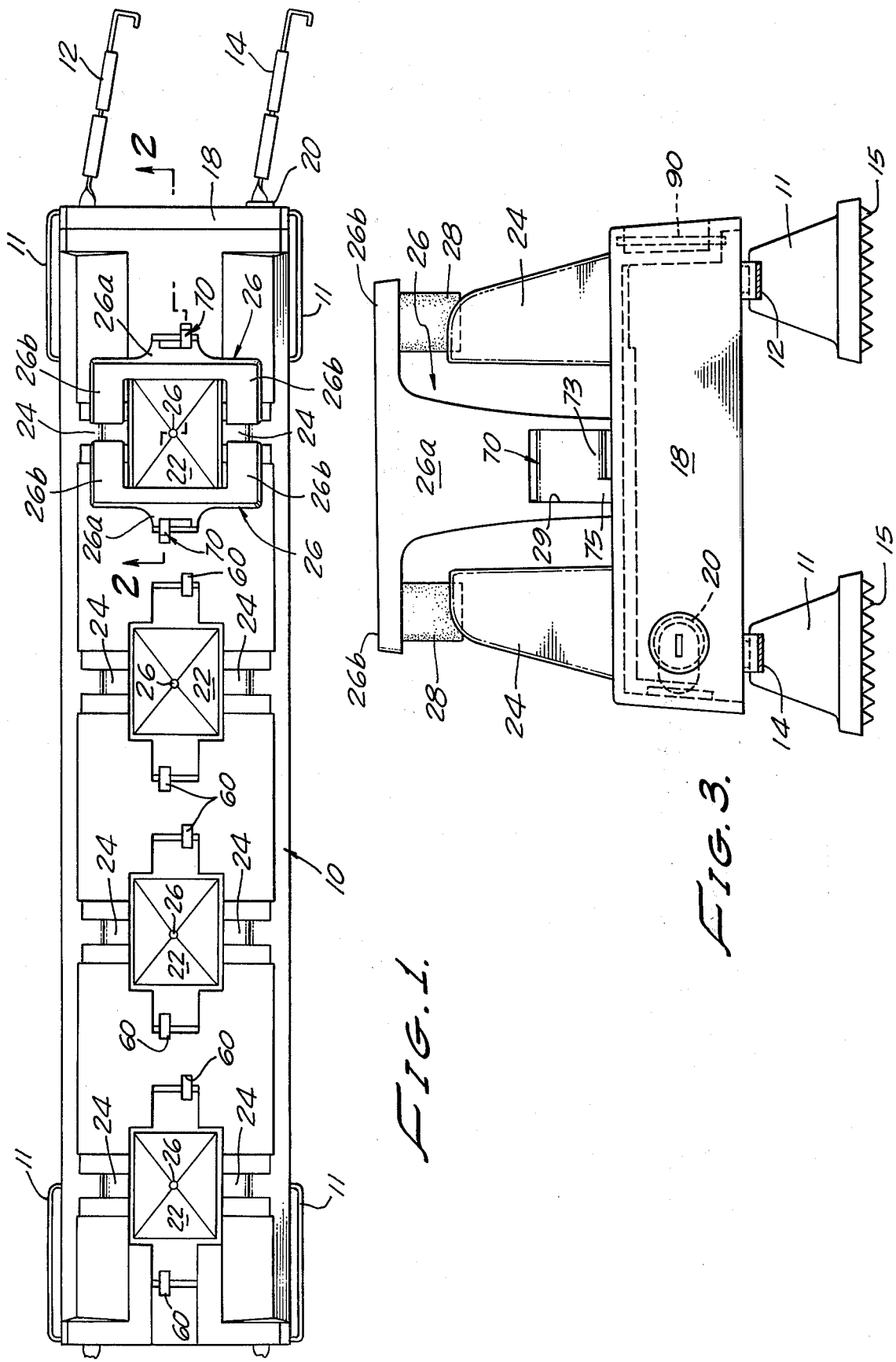

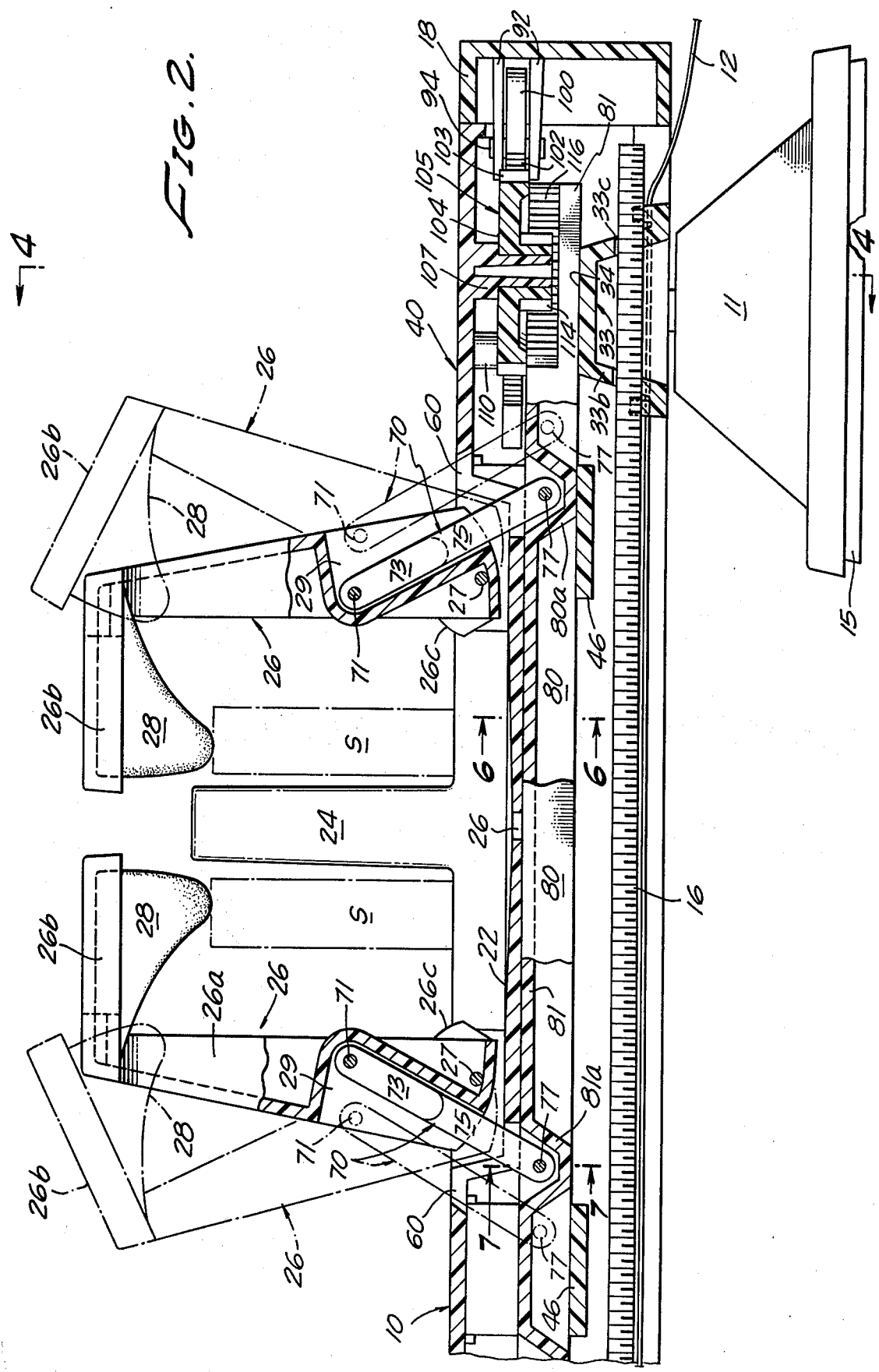

VEHICLE TOP SKI RACK

BACKGROUND OF THE INVENTION

The present invention relates to a ski rack for securing skis and poles to the top of a vehicle such as an automobile or van.

The prior art is replete with various types of ski racks suitable for securing skis and poles to the roof top of a vehicle. Typical prior art ski racks consist of at least two units spaced longitudinally of the vehicle. Each of the two units is customarily provided with a lower stationary clamping surface which extends transversely of the vehicle and a pair of pivotally mounted upper bars pivotally secured to the lower portion of the unit near the longitudinal center line of the vehicle. The upper bars, when pivoted upwardly from the longitudinal center line of the vehicle, allow the skis and poles to be placed on top of the lower bar for securing the skis and poles to the vehicle or to be removed from the units. In the clamping positions, the upper bars are parallel with the lower bars and the free ends of the upper bars are rigidly affixed to the extreme ends of the lower bars near the sides of the vehicle to clamp the skis and poles therebetween. As previously noted, two such units are required and are typically spaced two or three feet apart in the longitudinal direction of the vehicle.

There has recently been developed a portable hand-held device for carrying and securing skis which has come into widespread use and which is the subject of applicant's U.S. Pat. No. 3,990,655 dated Nov. 9, 1976. The carrying device disclosed in that patent enables the user to transport skis and poles with one hand and is thus very convenient to use.

It is accordingly an object of the present invention to provide a vehicle top ski carrier which can be particularly useful with a device for carrying and securing skis of the type disclosed in applicant's aforementioned U.S. Pat. No. 3,990,655.

It is a further object of the present invention to provide a vehicle top ski carrier in the form of a single unit which can be affixed to the vehicle top and which will rigidly and firmly clamp and lock the skis in position on the vehicle.

It is a further object of the present invention to provide a vehicle top ski carrier which is suitable for carrying a plurality of pairs of skis and poles regardless of whether the portable device of U.S. Pat. No. 3,990,655 is employed.

SUMMARY OF THE INVENTION

The present invention provides a rack for securing skis to a vehicle comprising:

(a) An elongated housing having adjustable means for securing the housing to a vehicle;

(b) at least one pair of stationary columns spaced transversely of said housing and secured to and extending upwardly from said housing;

(c) at least one pair of opposed clamps each pivotally mounted on said housing for movement about horizontal axes oriented transversely of said housing and moveable between a clamping position with said opposed clamps in proximity to said columns and a release position with said clamps located away from said columns on opposite sides thereof; and (d) actuating means for moving said clamps between said clamping position and said release position.

BRIEF DESCRIPTION OF THE DRAWINGS

FIG. 1 is a plan view of the ski rack showing, for clarity, a single one of a pair of clamps which are typically provided at four equally spaced locations.

FIG. 2 is a partial elevational view of the device along lines 2-2 on FIG. 1 showing movement of the clamps and actuating structure.

FIG. 3 is an elevational view of the right-hand end of the device.

DESCRIPTION OF THE PREFERRED EMBODIMENT

Figure 4:
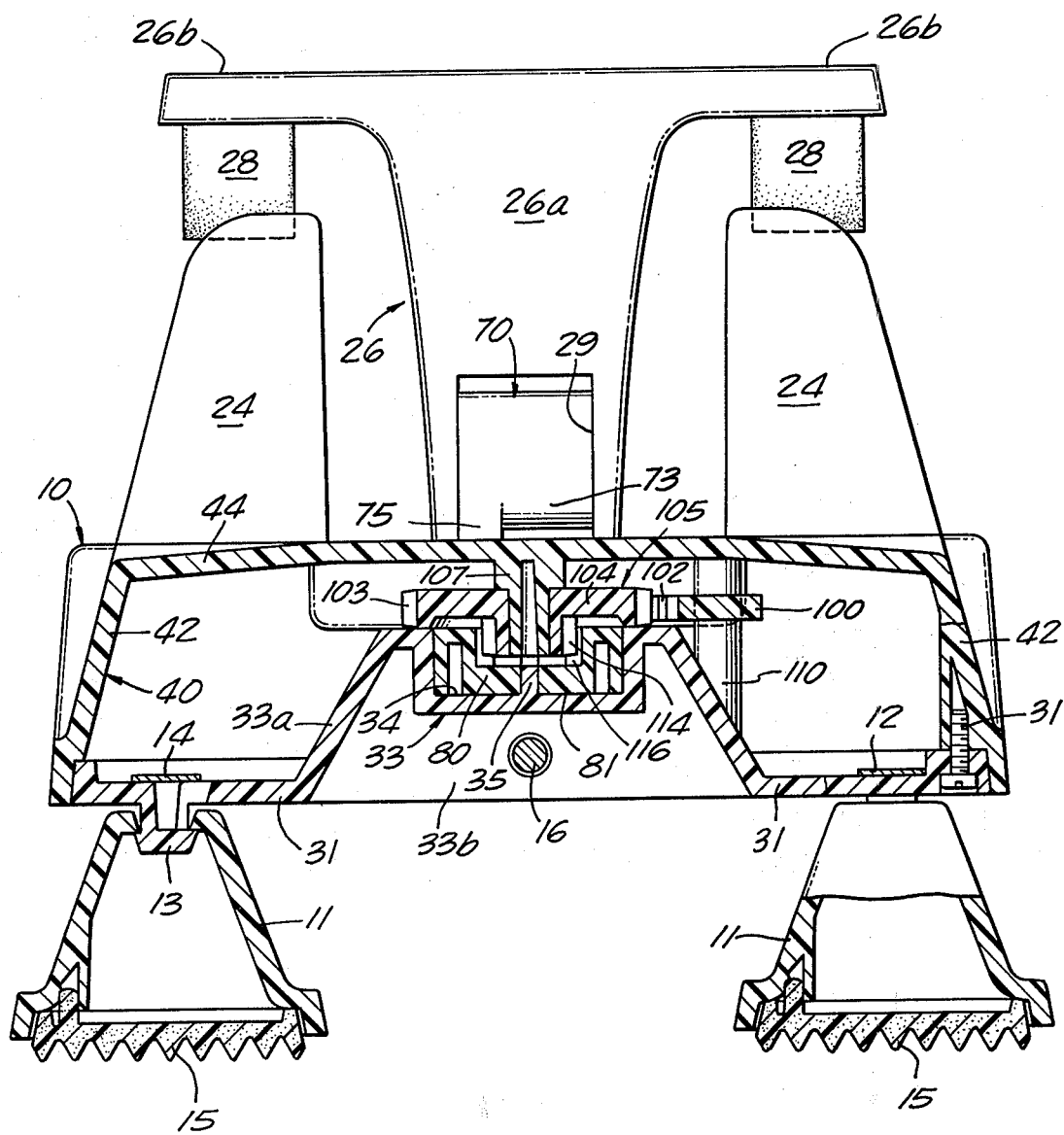
FIG. 4 comprises a sectional elevation view taken along lines 4-4 of FIG. 2.

As seen in FIG. 1 the device comprises an elongated housing 10 adapted to be mounted transversely on the roof of a vehicle and affixed to the vehicle by two straps 12,14 at either end of the housing 10. The straps on the left-hand end of the housing as seen in FIG. 1 are omitted due to space limitations but it will be appreciated by those skilled in the art that the strap connections to the vehicle roof are of generally conventional construction thus a full description of the details is omitted. Suffice it to say that the straps 12,14 comprise metallic bands which extend lengthwise through the housing 10 as best seen in FIG. 2. The straps 12,14 can be tightened or loosened by turning a threaded member 16 which is accessible when a door 18 at the right-hand end of the housing 10 is opened. The door 18 is typically provided with a lock mechanism 20 to prevent unauthorized tampering with the threaded member 16 and thus prevent loosening of the connecting straps 12,14.

At either end of the housing 10 are a pair of feet 11 for supporting the housing 10 on the roof of a vehicle. Typically, the feet 11 will be mounted with a suitable pivotal mounting 13 to the housing 10 so as to compensate for slight curvatures in the vehicle roof. On the bottom of each of the four feet 11 is a corrugated pad 15 typically of rubber or other soft material designed to prevent scratching of the vehicle roof.

At each of preferably four equally spaced locations on the housing are provided recessed areas 22 and posts 24 so that a pair of skis 5 and poles can be secured to the device at each of the four locations shown in a manner to be described hereinafter. Centrally located in each recess 22 is a drain hole 23.

The extreme right recess 22 as seen in FIG. 1 is shown with a pair of clamps 26 in a clamping position. Clamps are not shown at each of the other three recesses 22 so that the recesses 22 with the clamps removed can be more easily visualized.

Turning now to FIGS. 2 and 4, it will be seen that the housing 10 comprises a cover 40 of generally inverted channel shape as seen in cross-section in FIG. 4. Fastened at either end of the cover 40 are transverse braces 30 connected to the cover 40 by threaded fasteners 31 as seen in FIG. 4. It has been found that a third brace 30 centrally located intermediate the ends of cover 40 is desirable to lend structural rigidity to the device. Both the cover 40 and braces 30 are preferably formed of a suitable plastic material such as ABS.

Each brace 30 consists of a pair of spaced generally planar bottom flanges 31 located in a common horizontal plane. As seen in FIG. 4 the housing braces 30 are each constructed to define a centrally located slide guide 33 located above the bottom surfaces 31 and a pair of side-by-side slide channels 34 separated from each other by a central web 35 integrally formed as a part of the brace 30. The slide guide 33 is connected to said bottom flanges 31 by a pair of webs 33a. As seen in FIG. 2, braces 30 are formed as inverted channel sections 33b. Apertures 33c in the channels 33b provide clearance for threaded member 16.

The cover 40 has a pair of generally vertical walls 42 joined by a central portion 44 extending lengthwise of the ski rack. At each of the four recesses 22 the cover 40 has integrally formed therewith the aforementioned pair of upstanding posts 24 spaced apart in the transverse direction of the ski rack.

Fastened at spaced locations on the underside of central portion 44 of cover 40 are slide supports 46 of generally U-shaped configurations. The slide supports 46 are spaced intermediate the braces 30 at locations to ensure full support for longitudinal slides 80,81 to be described later.

Each of the four recesses 22 are formed by a generally rectangular indentation in the cover 40 as best seen in FIGS. 1 and 2 to provide a receiving area preferably selected of a size suitable for receiving the rectangular bottom of a ski carrier of the type disclosed in Applicant's aforementioned U.S. Pat. No. 3,990,655. A pair of apertures 60 are also provided in the cover 40 at the locations shown for receiving a pair of clamp actuating links 70.

The pair of opposed clamps 26 are pivotally connected by a pivot pin 27 to suitable bosses (not shown) integrally formed in cover 40. The clamps 26 are generally angularly shaped members consisting of a generally upright leg 26a and a pair of generally horizontal spaced feet 26b which provide clamp surfaces connected to the upright leg 26a. A compressible pad 28 is affixed to each of the horizontal clamp feet 26b as shown in FIG. 2 and compresses as it engages skis 5 to be clamped into position.

A clamping boss 26c is provided at the lower end of each clamp leg 26a and functions, when the ski rack is used with a ski carrier of the type shown in Applicant's aforementioned U.S. Pat. No. 3,990,655 to firmly secure the ski carrier base (not shown) in position in the recess 22. Bosses 26c move toward each other as the clamps 26 are moved from the open position to the clamping position as seen in FIG. 2 to pinch the base of the ski carrier (which is of a size to substantially occupy the full longitudinal and transverse extent of recess 22) therebetween. When ski carriers of the aforementioned type are to be placed into the ski rack, pads 28 are unnecessary and will be removed. If the ski rack is used to carry skis 5 without a carrier, then rubber pads 28 are necessary such that horizontal clamp feet 26b and pads 28 firmly engage the sides of the skis 5 to hold them in position.

The generally upright leg 26a of each clamp member 26 has a central indentation 29 for reception of the actuation link 70. The actuation link 70 is pivotally connected to the clamp 26 by a pin 71 (FIG. 2). It will be seen that the upper end of the link 70 has a thickened portion 73 which extends the full width of the indentation 29 in the clamp and which slidably engages the clamp 26 to guide the clamp 26 in an arcing movement in a plane extending parallel to the longitudinal direction of the device. A close running fit between the sides of the thickened portion 73 of the link 70 and the opposed surfaces of the clamp 26 at the indentation 29 prevents undue transverse wobbling or movement of the clamp 26.

A narrow end 75 of the link 70 extends downwardly through the aperture 60 in the cover 40 and is connected by a pin 77 to one, 80, of a pair of elongated slides 80,81 which ride in respective ones of the slide guides 33 and slide supports 46.

Figure 6:
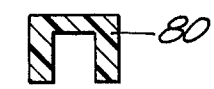
FIG. 6 is a partial cross-section along the lines 6—6 of FIG. 2 showing one of the slides in cross-section.
Figure 7:
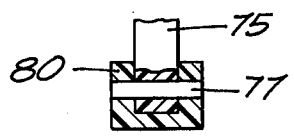
FIG. 7 is a cross-sectional view taken along lines 7—7 of FIG. 2 showing a cross-section of the slide mechanism at the point of connection with the link.

Each slide 80,81 comprises a member of generally inverted U-shaped configuration as seen in FIG. 6 and extends lengthwise of the ski rack past all four of the recesses 22. At each of four spaced locations along the length of the slides 80,81, the slides are formed with a transverse trough 80a, 81a which receive the narrow ends 75 of links 70 and connecting pins 77. Since the right-hand clamp 26 as seen in FIG. 2 is connected to the left-hand slide 80 in FIG. 4, it will be appreciated that movement of the left-hand slide 80 to the right causes link 70 to pivot the right-hand clamp 26 of FIG. 2 in a clockwise direction about its pivot pin 27 thus moving the right-hand clamp 26 from the clamp position to the open position shown in phantom. Similarly, the left-hand clamp 26 of FIG. 2 is connected to the right-hand slide 81 of FIG. 4 such that movement of the right-hand slide 81 to the left as seen in FIG. 2 causes the left-hand clamp 26 to move from the clamped position to the open position.

The two slides 80,81 are smililarly clamped to clamps 26 located at each of the four pedestal locations 22 such that movement of one 80 of the slides 80,81 in one direction simultaneously with movement of the other slide 81 in the other direction will either open or close the clamps 26 at all four locations depending on the direction of movement of the slides 80,81.

Figure 5:
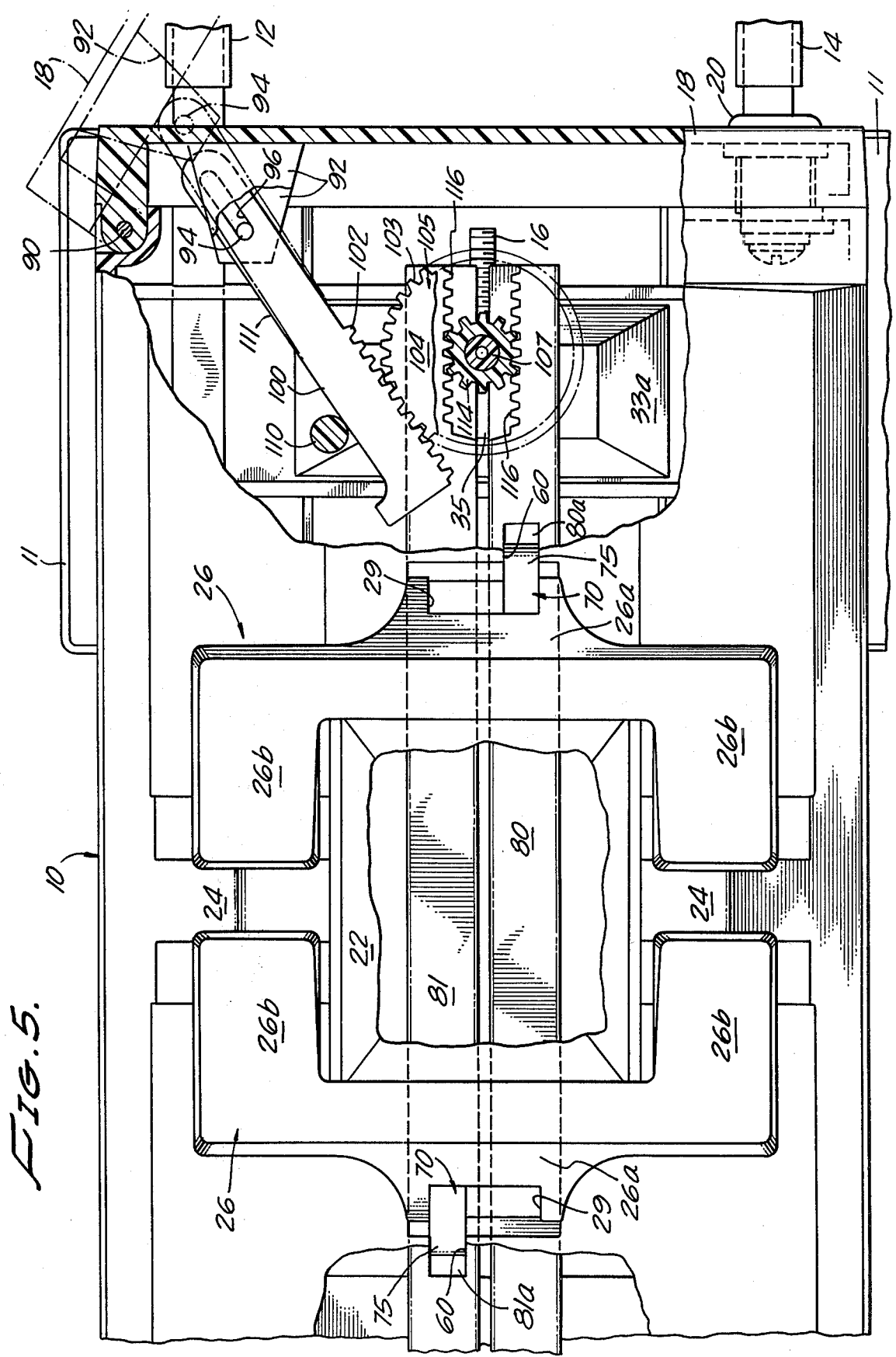
FIG. 5 is a partial plan view partly broken away to show a portion of the top of the device with the particular details of the actuation mechanism.

Simultaneous actuation of the slides 80,81 in opposite directions is achieved through a gear arrangement located at the right-hand end of the device as seen in FIGS. 2 and 5.

The door 18 at the right-hand end of the housing is pivotally mounted to the housing by a pin 90 so that the door 18 can swing between the closed position as seen in solid lines in FIG. 5 to the open position as seen in phantom lines in FIG. 5. A lock 20 securely fastens the door 18 in the closed position.

The door 18 is provided with a pair of spaced parallel hinges 92. Connected to the hinges 92 by a pin 94 and lost motion connection is an elongated gear actuator 100 having teeth 102 at one end thereof engagable with teeth 103 on a large diameter portion 104 of a pinion gear 105 pivotally connected to a boss 107 integrally formed on the under surface of the cover 40. An elongated slot 96 in the gear actuator 100 which receives the pin 94 connecting the gear actuator to the door provides the lost motion connection to enable opening of the door 18 to a limited extent before further movement of the door 18 in the opening direction causes generally longitudinal movement of the gear actuator 100. A vertical post 110 extending between the end brace 30 and cover 40 is engagable with a side 111 of the gear actuator 100 to maintain engagement of teeth 102 on the gear actuator 100 with teeth 103 on the large diameter portion of the gear 105.

A small diameter gear portion 106 integrally formed with the large diameter gear portion 104 has teeth 114 thereon engagable with opposed teeth 116 integrally formed on the right-hand end of the opposed slide members 80,81. It can accordingly be seen that opening of the door 18 causes the gear actuator 100 to turn the pinion gear 105 clockwise which in turn causes one slide 80 to move to the left and the other slide 81 to move to the right thus opening the clamps 26 from the clamped position seen in solid lines in FIG. 2 to the open position seen in phantom lines.

As hereinbefore indicated, the device is particularly useful with a ski carrier of the type disclosed in Applicant's aforementioned U.S. patent. The device is operable with equal facility regardless of whether a ski carrier of the type disclosed in Applicant's aforementioned U.S. patent is employed since the rubber pads 28 on the under side of the clamp arms 26b tightly engage a pair of skis 5 as seen in phantom line position in FIG. 2 to firmly hold them against the upstanding posts 24 and secure them in a desired position.

Applicant has found that a single device of this type can be used to firmly fasten as many as four separate pairs of skis and poles on the roof of a vehicle for transportation and that a second ski rack is no longer necessary.

I claim:
1. A rack for securing skis to a vehicle comprising:
   (a) an elongated housing having adjustable means for securing the housing to a vehicle;
   (b) at least one pair of stationary columns spaced transversely of said housing and secured to and extending upwardly from said housing;
   (c) at least one pair of opposed clamps each pivotally mounted for movement about horizontal axes oriented transversely of said housing and moveable between a clamping position with said opposed clamps in proximity to said columns and a release position with said clamps located away from said columns on opposite sides thereof; and
   (d) actuating means for moving said clamps between said clamping position and said release position, said actuating means comprising a pair of elongated parallel slides mounted for movement longitudinally in said housing, a pair of links respectively each having a first pivotal connection to a respective one said clamps and a second pivotal connection to a respective one of said slides whereby longitudinal movement of said slides causes said links to pivotally move said clamps between their clamping and release positions, and a rotatable drive means mounted in said housing and having connecting means thereon engageable with connecting means on each of said slides, and means for rotating said drive means to cause said parallel slides to move in opposite directions.

2. A ski rack according to claim 1 wherein said rotatable drive means is a pinion gear and said connecting means on said drive means and on said slides comprises interengaged teeth.

3. A ski rack according to claim 2, wherein said means for rotating said pinion gear comprises an elongated gear actuator having teeth thereon engageable with a set of actuator teeth on said pinion gear, said gear actuator being located within said housing and actuatable from one end of said housing.

4. A ski rack according to claim 3, further comprising a door at one end of said housing pivotally connected to said housing for opening and closing a security area in the end of said housing, said security area enclosing said pinion gear and gear actuator.

5. A ski rack according to claim 4 wherein one end of said gear actuator is pivotally connected to said door whereby movement of said door from a closed to an open position moves said gear actuator in a direction to cause said clamps to move from a clamping position to a release position.

6. A ski rack according to claim 5 including a gear actuator guide post stationarily mounted in said housing and having a surface engageable with a surface of said gear actuator for maintaining said gear actuator teeth in engagement with said pinion gear teeth.

7. A ski rack according to claim 5 wherein said gear actuator is pivotally connected to said door with a lost motion connection to permit partial opening of said door before movement of said gear actuator.

8. A ski rack according to claim 5 wherein each of said clamps has an upstanding leg pivotally connected at one end to said housing, said housing having a recess in its upper surface disposed between two opposed upstanding clamp legs, and clamp surfaces on each of said clamp legs which enter said recess as said clamps are moved from said release position to said clamping position.

9. A ski rack according to claim 1 wherein each of said clamps has an upstanding leg pivotally connected at one end to said housing and having a pair of spaced feet connected to the other end of said leg, said feet being generally parallel to said housing when said clamps are in the clamped position and spaced from each other in a direction transversely of said housing.

10. A ski rack according to claim 1 wherein said spaced stationary columns are located between and below the ends of opposed spaced feet on oppositely arranged clamps disposed on opposite sides of said columns in the longitudinal direction of said housing.

11. A ski rack according to claim 1 wherein each of said clamps has an upstanding leg pivotally connected at one end to said housing, said housing having a recess in its upper surface disposed between two opposed upstanding clamp legs, and clamp surfaces on each of said clamp legs which enter said recess as said clamps are moved from said release position to said clamping position.

* * * * *